United States Patent Office 3,180,701
Patented Apr. 27, 1965

3,180,701
ADDUCT OF B-TRICHLOROBORAZOLE
AND PERCHLORIC ACID
Roy J. Laran, Baton Rouge, La., assignor to Ethyl Corporation, New York, N.Y., a corporation of Virginia
No Drawing. Filed Feb. 26, 1962, Ser. No. 176,866
1 Claim. (Cl. 23—14)

A novel and useful chemical, B-trichloroborazole trihydrogen perchlorate, is provided by this invention.

It is made by reacting anhydrous perchloric acid with B-trichloroborazole (the chlorines are attached to the boron atoms) at low temperatures (e.g. −75 to 25° C). For example, an excess of anhydrous perchloric acid [see J. Am. Chem. Soc. 75, 184 (1953)] was contacted with B-trichloroborazole [see J. Chem. Soc. 1959, 1306–7] under essentially anhydrous conditions while keeping the system at about −10° C. The reactants were used in a mole ratio of at least about 6:1, respectively. After several hours of contact time, the excess acid was removed by evacuation. The B-trichloroborazole trihydrogen perchlorate was a tan powdery substance which on analysis for N, $ClO_4$, Cl, and B showed that these components were in the mole ratio of 1:1:1:1. The infrared spectrum indicated a high perchlorate content (approximately theoretical), a highly hindered OH radical (hydrogen bonding with the $ClO_4$ radical), and that the borazole ring was intact. The reaction was:

$$B_3N_3H_3Cl_3 + 3HClO_4 \rightarrow B_3N_3H_3Cl_3 \cdot 3HClO_4$$

This indicates that addition takes place to form an $HClO_4$ adduct with the free electron pair of the N atom. Analytical data to support the above mole ratio and reaction equation are:

Calcd.: N, 8.66; $ClO_4$, 61.5; Cl, 21.9; B, 6.68. Found: N, 8.20; $ClO_4$, 61.7; Cl, 20.4; B, 6.70.

Temperature is an important feature of the above process. When attempting to carry out the above procedure at 50° C., only an amber-colored polymer-like material was produced.

Anhydrous B-trichloroborazole trihydrogen perchlorate is sensitive to sharp physical shock. However, it has been heated to temperatures as high as 50° C. without exploding. Hence this chemical is useful as an explosive for use in percussion caps and other percussive detonation devices.

What is claimed is:

Anhydrous B-trichloroborazole trihydrogen perchlorate, having the formula $B_3N_3H_3Cl_3 \cdot 3HClO_4$.

References Cited by the Examiner
UNITED STATES PATENTS 2,917,543  12/53  Smalley et al. ———————— 23—14
2,951,867   9/60  Stafiej et al. ———————— 23—14

MAURICE A. BRINDISI, Primary Examiner.

CARL D. QUARFORTH, Examiner.